United States Patent
Yu et al.

(10) Patent No.: US 9,280,196 B2
(45) Date of Patent: Mar. 8, 2016

(54) COMPUTER SYSTEM AND POWER MANAGEMENT METHOD THEREOF

(71) Applicant: Quanta Computer Inc., Tao Yuan Shien (TW)

(72) Inventors: Chun-Jie Yu, Keelung (TW); Yu-Hui Chen, Tao Yuan Shien (TW); Sheng-Wen Wu, Taoyuan County (TW); Ming-Tsung Ho, New Taipei (TW)

(73) Assignee: QUANTA COMPUTER INC., Tao Yuan Shien (TW)

( * ) Notice: Subject to any disclaimer, the term of this patent is extended or adjusted under 35 U.S.C. 154(b) by 386 days.

(21) Appl. No.: 13/955,391

(22) Filed: Jul. 31, 2013

(65) Prior Publication Data
US 2014/0380073 A1    Dec. 25, 2014

(30) Foreign Application Priority Data
Jun. 20, 2013   (TW) .............. 102121956 U

(51) Int. Cl.
*G06F 1/32* (2006.01)
*G06F 1/00* (2006.01)
*G06F 1/26* (2006.01)

(52) U.S. Cl.
CPC .............. *G06F 1/3206* (2013.01); *G06F 1/324* (2013.01); *G06F 1/26* (2013.01)

(58) Field of Classification Search
CPC ...................................... G06F 1/32; G06F 1/26
See application file for complete search history.

(56) References Cited

U.S. PATENT DOCUMENTS 7,132,822 B1 * 11/2006 Breitlow .................. G06F 1/30
                                                               324/142
8,484,489 B2 *  7/2013 Wu ........................... G06F 1/26
                                                               713/300

(Continued)

FOREIGN PATENT DOCUMENTS

TW    200921353 A    5/2009
TW    201202890 A    1/2012

OTHER PUBLICATIONS http://powerelectronics.com/ac-dc-power-supplies/95-efficient-250-watt-convection-cooled-power-supply "power supply with 95% efficiency", 3 pages, Jul. 20, 2012.*

*Primary Examiner* — Phil Nguyen
(74) *Attorney, Agent, or Firm* — Rabin & Berdo, P.C.

(57) ABSTRACT

A power management method for a computer system is provided. The power management method includes: obtaining a system power consumption; determining whether the system power consumption is greater than a first safe operating point; when the system power consumption is greater than the first safe operating point, controlling a CPU and a graphics processing unit (GPU) to activate a frequency reduction mechanism according to a first adjustment sequence; when the system power consumption is not greater than the first safe operating point, determining whether the system power consumption is smaller than a second safe operating point; and when the system power consumption is smaller than the second safe operating point, controlling the CPU and the GPU to deactivate the frequency reduction mechanism according to a second adjustment sequence. The second adjustment sequence is reverse to the first adjustment sequence.

22 Claims, 3 Drawing Sheets

(56) References Cited

U.S. PATENT DOCUMENTS

| | | | | |
|---|---|---|---|---|
| 8,555,091 B2 * | 10/2013 | Costales | G06F 1/3203 | 713/300 |
| 2004/0236969 A1 * | 11/2004 | Lippert | G06F 1/3203 | 713/300 |
| 2005/0138438 A1 * | 6/2005 | Bodas | G06F 1/3287 | 713/300 |
| 2006/0103996 A1 * | 5/2006 | Carroll | G06F 1/3203 | 361/90 |
| 2009/0049327 A1 * | 2/2009 | Chung | G06F 1/3203 | 713/600 |
| 2010/0218029 A1 * | 8/2010 | Floyd | G06F 1/3203 | 713/601 |
| 2012/0011377 A1 * | 1/2012 | Yu | G06F 1/206 | 713/300 |
| 2013/0007413 A1 * | 1/2013 | Thomson | G06F 1/324 | 712/30 |
| 2013/0339757 A1 * | 12/2013 | Reddy | G06F 1/3212 | 713/300 |

\* cited by examiner

COMPUTER SYSTEM AND POWER MANAGEMENT METHOD THEREOF

This application claims the benefit of Taiwan application Serial No. 102121956, filed Jun. 20, 2013, the subject matter of which is incorporated herein by reference.

BACKGROUND OF THE INVENTION

1. Field of the Invention

The invention relates in general to an electronic apparatus, and more particularly to computer system and a power management method thereof.

2. Description of the Related Art

With continual enhancement in performance of high-end laptop computers, power consumption of a CPU and a graphics processing unit (GPU) is also remarkably increased. Conventionally, to avoid a power supply in providing insufficient power to a system load, a rated power provided by the power supply is frequently augmented. Such method, although being capable of preventing a power shutdown of a system load resulted by insufficient power, also leads to increased costs due to an excessive design of the power supply as the system load does not at all times operate at a full load.

SUMMARY OF THE INVENTION

The invention is directed to a computer system and a power management method thereof.

According to a first aspect of the present invention, a computer system is provided. The computer system comprises a system load and an AC adapter. The system load comprises a CPU, a graphics processing unit (GPU) and an embedded controller. The embedded controller obtains a system power consumption, and determines whether the system power consumption is greater than a first safe operating point. When the system power consumption is greater than the first safe operating point, the embedded controller controls the CPU and the GPU to activate a frequency reduction mechanism according to a first adjustment sequence. When the power consumption is not greater than the first safe operating point, the embedded controller determines whether the system power consumption is smaller than a second safe operating point. When the system power consumption is smaller than the second safe operating point, the embedded controller controls the CPU and the GPU to deactivate the frequency reduction mechanism according to a second adjustment sequence. The second adjustment sequence is reverse to the first adjustment sequence. The AC adapter is coupled to the system load, and powers the system load. The first adjustment sequence is a first frequency reduction mode, a second frequency reduction mode and a third frequency reduction mode. The second adjustment sequence is the third frequency reduction mode, the second frequency reduction mode and the first frequency reduction mode. In the first frequency reduction mode, the embedded controller disables a frequency reduction function of the CPU and the GPU. In the second frequency reduction mode, the embedded controller disables the frequency reduction function of the CPU and enables the frequency reduction function of the GPU. In the third frequency reduction mode, the embedded controller enables the frequency reduction function of the CPU and the GPU.

According to another aspect of the present invention, a power management method for a computer system is provided. The computer system comprises a system load and an AC adapter. The AC adapter is coupled to the system load, and powers the system load. The system load comprises a CPU and a GPU. The power management method comprises: obtaining a system power consumption; determining whether the system power consumption is greater than a first safe operating point; when the system power consumption is greater than the first safe operating point, controlling the CPU and the GPU to activate a frequency reduction mechanism according to a first adjustment sequence; when the system power consumption is not greater than the first safe operating point, determining whether the system power consumption is smaller than a second safe operating point; and when the system power consumption is smaller than the second safe operating point, controlling the CPU and the GPU to deactivate the frequency reduction mechanism according to a second adjustment sequence. The second adjustment sequence is reverse to the first adjustment sequence. The second adjustment sequence is reverse to the first adjustment sequence. The first adjustment sequence is a first frequency reduction mode, a second frequency reduction mode and a third frequency reduction mode. The second adjustment sequence is the third frequency reduction mode, the second frequency reduction mode and the first frequency reduction mode. In the first frequency reduction mode, a frequency reduction function of the CPU and the GPU is disabled. In the second frequency reduction mode, the frequency reduction function of the CPU is disabled and the frequency reduction function of the GPU is enabled. In the third frequency reduction mode, the frequency reduction function of the CPU and the GPU is enabled.

The above and other aspects of the invention will become better understood with regard to the following detailed description of the preferred but non-limiting embodiments. The following description is made with reference to the accompanying drawings.

DETAILED DESCRIPTION OF THE INVENTION

First Embodiment

TABLE 1

| Rated power of AC adapter | First safe operating point (rated power × 95%) | Second safe operating point (rated power × 90%) |
| --- | --- | --- |
| 65 W | 61 W | 58 W |
| 90 W | 85 W | 81 W |
| 120 W | 114 W | 108 W |

TABLE 2

| Frequency reduction mode | Frequency reduction function of CPU | Frequency reduction function of GPU |
|---|---|---|
| First frequency reduction mode | Disable | Disable |
| Second frequency reduction mode | Disable | Enable |
| Third frequency reduction mode | Enable | Enable |

Figure 1:
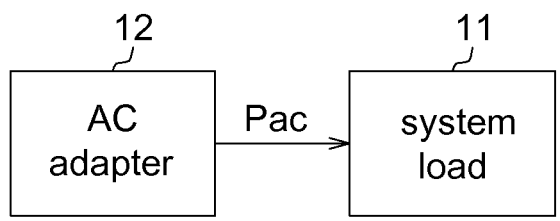
FIG. 1 shows a schematic diagram of a computer system according to a first embodiment of the present invention.
Figure 2:
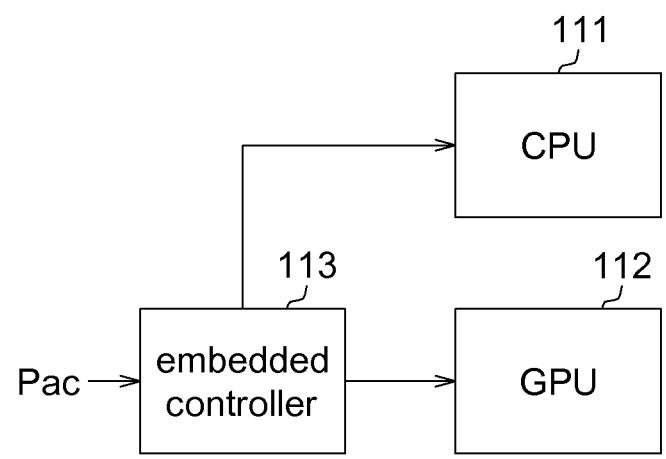
FIG. 2 shows a partial schematic diagram of a system load according to the first embodiment of the present invention.
Figure 3:
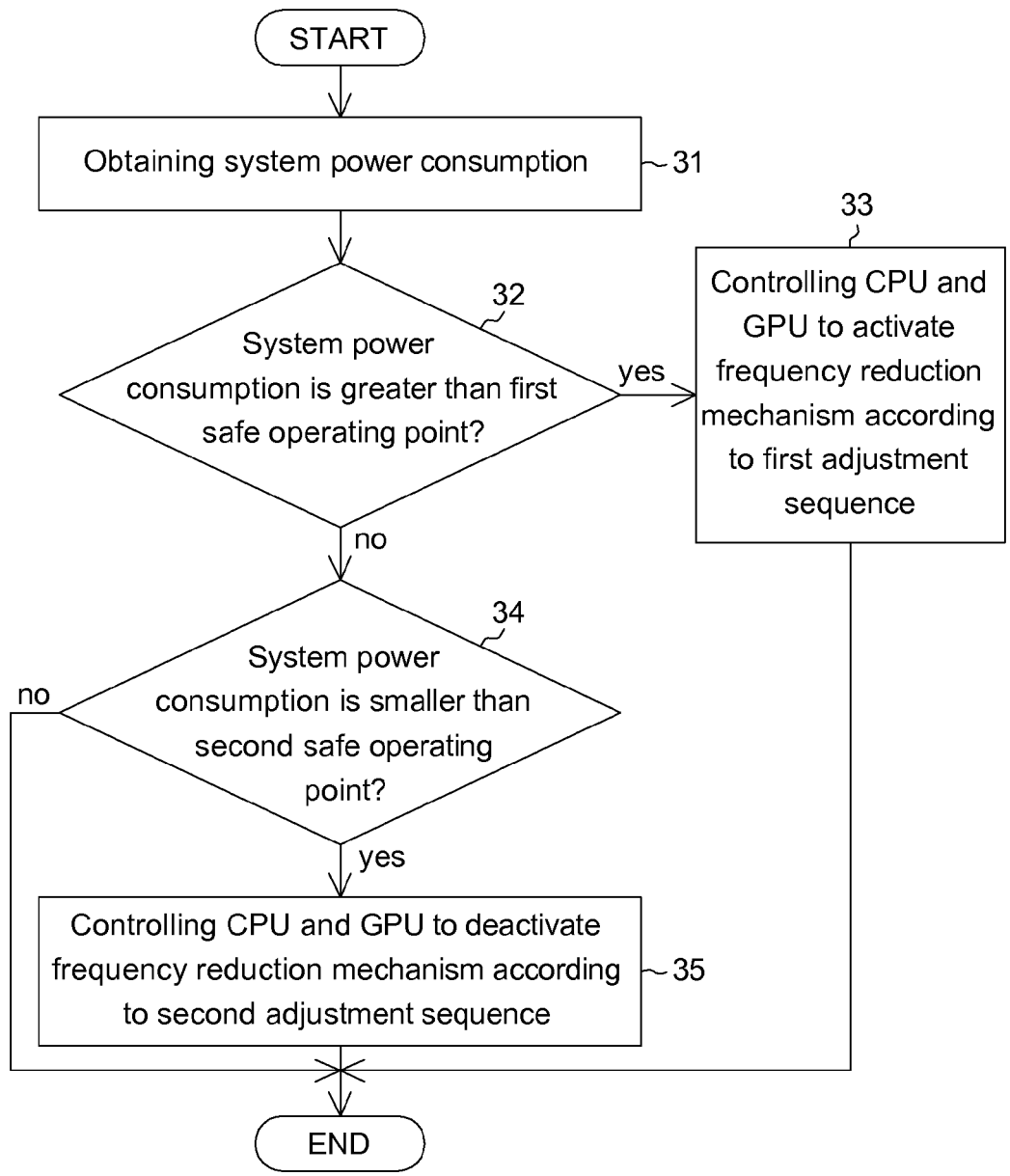
FIG. 3 shows a flowchart of a power management method for a computer system according to the first embodiment of the present invention.

Table-1 records first safe operating points and second safe operating points corresponding to rated powers of different AC adapters. Table-2 records enable/disable states of a frequency reduction function of a CPU and a graphics processing unit (GPU) under different frequency reduction modes. FIG. 1 shows a schematic diagram of a computer system according to a first embodiment. FIG. 2 shows a partial schematic diagram of a system load according to the first embodiment. FIG. 3 shows a flowchart of a power management method for a computer system according to the first embodiment. Referring to Table-1, Table-2, and FIGS. 1, 2 and 3, for example, a computer system 1 is a laptop computer or a tablet computer, and comprises a system load 11 and an AC adapter 12. The AC adapter 12 is coupled to the system load 11, and converts city electricity to a DC voltage for powering the system load 11. The system load 11 comprises a CPU 111, a GPU 112 and an embedded controller 113. The power management method for the computer system 1 comprises the following steps. In step 31, the embedded controller 113 obtains a system power consumption Pac of the system load 11. In step 32, the embedded controller 113 determines whether the system power consumption Pac is greater than a first safe operating point. For example, the first safe operating point is 90% of a rated power of the AC adapter 12. The first safe operating point is generally regulated in specifications of the power adapter 12. For example, the first safe operating point is 61 W when the rated power of the AC adapter 12 is 65 W, 85 W when the rated power of the AC adapter 12 is 90 W, and 114 W when the rated power of the AC adapter 12 is 120 W.

When the system power consumption Pac is greater than the first safe operating point, step 33 is performed. In step 33, the embedded controller 113 controls the CPU 111 and the GPU 112 to activate a frequency reduction function according to a first adjustment sequence. The first adjustment sequence is the first frequency reduction mode, the second frequency reduction mode and the third frequency reduction mode in Table-2. In the first frequency reduction mode, the embedded controller 113 disables the frequency reduction function of the CPU 111 and the GPU 112. In the second frequency reduction mode, the embedded controller 113 disables the frequency reduction function of the CPU 111 and enables the frequency reduction function of the GPU 112. In the third frequency reduction mode, the embedded controller 111 enables the frequency reduction function of the CPU 111 and the GPU 112. Therefore, the second frequency reduction mode is more power-saving the first frequency reduction mode, and the third frequency reduction mode is more power-saving than the second frequency reduction mode.

For example, when the CPU 111 and the GPU 112 are originally in the first frequency reduction mode and the system power consumption Pac is greater than the first safe operating point, the embedded controller 113 controls the CPU 111 and the GPU 112 according to the first adjustment sequence to change from the first frequency reduction mode to the second frequency reduction mode. In the second frequency reduction mode, the embedded controller 113 enables the frequency reduction function of the GPU 112 to reduce the system power consumption Pac. Similarly, when the CPU 111 and the GPU 112 are originally in the second frequency reduction mode and the system power consumption Pac is greater than the first safe operating point, the embedded controller 113 controls the CPU 111 and the GPU 112 according to the first adjustment sequence to change from the second frequency reduction mode to the third frequency reduction mode. In the third frequency reduction mode, the embedded controller 113 enables the frequency reduction function of the CPU 111 and the GPU 112 to further reduce the system power consumption Pac.

Conversely, when the system power consumption Pac is not greater than the first safe operating point, step 34 is performed. In step 34, the embedded controller 113 determines whether the system power consumption Pac is smaller than a second safe operating point. For example, the second safe operating point is 90% of the rated power of the AC adapter 12. The second safe operating point is generally regulated in specifications of the power adapter 12. For example, the second safe operating point is 58 W when the rated power of the AC adapter 12 is 65 W, 81 W when the rated power of the AC adapter 12 is 90 W, and 108 W when the rated power of the AC adapter 12 is 120 W. When the system power consumption Pac is not smaller than the second safe operating point, the process of the power management method ends. At this point, the CPU 111 and the GPU 112 maintain the original frequency reduction mode.

Conversely, when the system power consumption Pac is smaller than the second safe operating point, step 35 is performed. In step 35, the embedded controller 113 controls the CPU 111 and the GPU 112 to deactivate the frequency reduction mechanism. The second adjustment sequence is reverse to the first adjustment sequence. That is, the second adjustment sequence is the third frequency reduction mode, the second frequency reduction mode and the first frequency reduction mode.

For example, when the CPU 111 and the GPU 112 are originally in the third frequency reduction mode and the system power consumption Pac is smaller than the second safe operating point, the embedded controller 113 controls the CPU 111 and the GPU 112 according to the second adjustment sequence to change from the third frequency reduction mode to the second frequency reduction mode. In the second frequency reduction mode, the embedded controller 113 disables the frequency reduction function of the CPU 111. Similarly, when the CPU 111 and the GPU 112 are originally in the second frequency reduction mode and the system power consumption Pac is smaller than the second safe operating point, the embedded controller 113 controls the CPU 111 and the GPU 112 according to the second adjustment sequence to change from the second frequency reduction mode to the first frequency reduction mode. In the first frequency reduction mode, the embedded controller 113 disables the frequency reduction function of the CPU 111 and the GPU 112.

Further, before the embedded controller 113 determines whether the system power consumption Pac is greater than the first safe operating point or the second safe operating point, in addition to directly obtaining the system power consumption Pac, noises of the obtained system power consumption Pac maybe further filtered out according to a filter algorithm. For example, the filter algorithm is a moving average filter (MAF) algorithm or an exponential smoothing filter (ESF) algorithm.

The computer system 1 dynamically disables or enables the frequency reduction function of the CPU 111 and the GPU 112. When the system power consumption Pac is greater than the first safe operating point, the frequency reduction mechanism is activated to reduce the system power consumption Pac. When the system power consumption Pac is smaller than the second safe operating point, the frequency reduction mechanism is deactivated to increase the performance of the computer system 1. Thus, not only the system power consumption Pac can be rapidly reduced, but also an excessive design of the AC adapter can be avoided to achieve cost reduction. Further, a power showdown of the computer system 1 due to insufficient power may be prevented.

Second Embodiment

| Voltage Turbo Boost (VTB) | Total power consumption ≥ System rated power | Total power consumption < System rated power |
|---|---|---|
| Enable | Powered by AC adapter and battery | Powered by AC adapter, battery being recharged |
| Disable | Powered by only AC adapter | Powered by AC adapter, battery being recharged |

Figure 4:
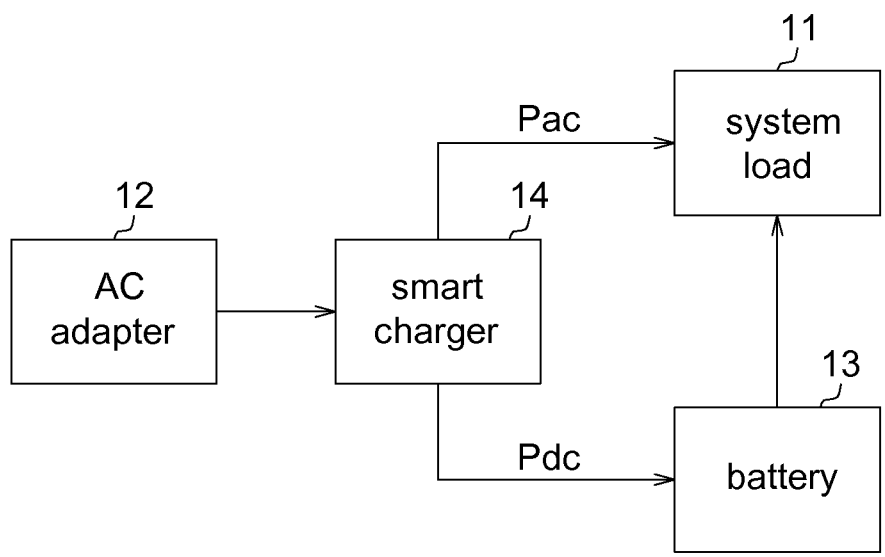
FIG. 4 shows a schematic diagram of computer system according to a second embodiment of the present invention.
Figure 5:
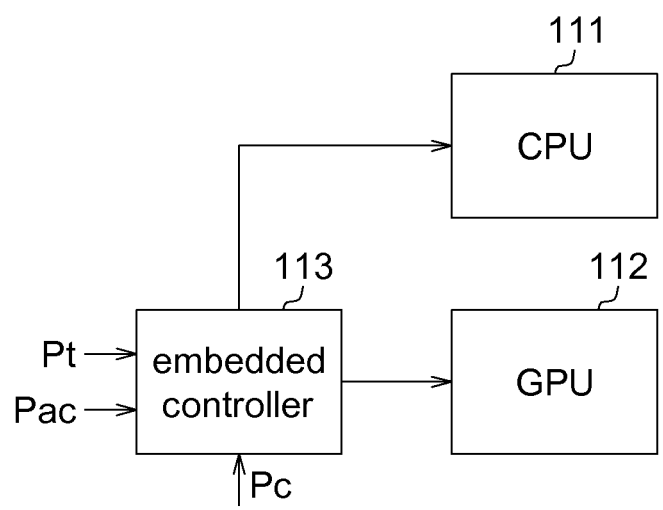
FIG. 5 shows a partial schematic diagram of a system load according to the second embodiment of the present invention.

Table-3 records power conditions of an AC adapter and a battery after enabling/disabling a voltage turbo boost function. FIG. 4 shows a schematic diagram of a computer system according to a second embodiment. FIG. 5 shows a partial schematic diagram of a system load according to the second embodiment. A main difference of the second embodiment from the first embodiment is that, a computer system 2 further comprises a battery 13 and a smart charger 14. The embedded controller 113 obtains a remaining power percentage Pc of the battery 13, and determines whether the remaining power percentage Pc is smaller than a threshold. An end voltage of the battery 13 lowers as the remaining power of the battery 13 reduces. To maintain the power provided by the battery 13, a discharge current of the battery 13 also rises. To prevent the battery 13 from damages caused by an excessive discharge current of the battery 13, a design of a threshold is further provided in the second embodiment. For example, the threshold is 30%. When the remaining power percentage Pc is smaller than the threshold, the embedded controller 13 disables the voltage turbo boost function of the smart charger 14. Conversely, when the remaining power percentage Pc is not smaller than the threshold, the embedded controller 113 enables the voltage turbo boost function of the smart charger 14.

The embedded controller 113 obtains a total power consumption Pt, and determines whether the total power consumption Pt is greater than or equal to the system rated power. The total power consumption Pt is equal to the system power consumption Pac and a power Pdc consumed by recharging the battery 13. When the embedded controller 113 enables the voltage turbo boost function of the smart charger 14 and the total power consumption Pt is greater than or equal to the system rated power, the battery 13 and the AC adapter 12 jointly power the system load 11. When the embedded controller 113 enables the voltage turbo boost function of the smart charger 14 and the total power consumption Pt is not greater than or not equal to the system rated power, only the AC adapter 12 powers the system load 11 while the battery 13 is being recharged.

When the embedded controller 113 disables the voltage turbo boost function of the smart charger 14 and the total power consumption Pt is greater than or equal to the system rated power, only the AC adapter 12 powers the system load 11. When the embedded controller 113 disables the voltage turbo boost function of the smart charger 14 and the total power consumption Pt is not greater than or not equal to the system rated power, only the AC adapter 12 powers the system load 11 while the battery 13 is being recharged.

Further, only when the computer system 2 is in the second frequency reduction mode and the remaining power percentage is smaller than the threshold, the embedded controller 113 enables the frequency reduction function of the GPU 112. Similarly, only when the computer system 2 is in the third frequency reduction mode and the remaining power percentage is smaller than the threshold, the embedded controller 113 enables the frequency reduction function of the CPU 111 and the GPU 112. Thus, the battery 13 can be prevented from damages due to an excessive discharge current.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A computer system, comprising:
   a system load, comprising:
      a CPU;
      a graphics processing unit (GPU); and
      an embedded controller, for obtaining a system power consumption and determining whether the system power consumption is greater than a first safe operating point; when the system power consumption is greater than the first safe operating point, the embedded controller controlling the CPU and the GPU to activate a frequency reduction mechanism according to a first adjustment sequence; when the system power consumption is not greater than the first safe operating point, the embedded controller determining whether the system power consumption is smaller than a second safe operating point; when the system power consumption is smaller than the second safe operating point, the embedded controller controlling the CPU and the GPU to deactivate the frequency reduction mechanism according to a second adjustment sequence; wherein, the second adjustment sequence is reverse to the first adjustment sequence;
   an AC adapter, coupled to the system load, for powering the system load;
   a battery; and
   a smart charger;
   wherein, the embedded controller obtains a remaining power percentage of the battery, and determines whether the remaining power percentage is smaller than a threshold; when the remaining power percentage is smaller than the threshold, the embedded controller disables a voltage turbo boost function of the smart charger; and when the remaining power percentage is not smaller than the threshold, the embedded controller enables a voltage turbo boost function of the smart charger; and
   wherein, the first adjustment sequence is a first frequency reduction mode, a second frequency reduction mode and a third frequency reduction mode; the second adjustment sequence is the third frequency reduction mode, the second frequency reduction mode and the first frequency reduction mode; in the first frequency reduction mode, the embedded controller disables a frequency reduction function of the CPU and the GPU; in the second frequency reduction mode, the embedded controller disables the frequency reduction function of the CPU and enables the frequency reduction function of the GPU; in the third frequency reduction mode, the embedded controller enables the frequency reduction function of the CPU and the GPU.

2. The computer system according to claim 1, wherein the embedded controller first filters out noises of the system power consumption according to a filter algorithm, and then determines whether the system power consumption is greater than the first safe operating point.

3. The computer system according to claim 2, wherein the filter algorithm is a moving average filter (MAF) algorithm or an exponential smoothing filter (ESF) algorithm.

4. The computer system according to claim 1, wherein the embedded controller first filters out noises of the system power consumption according to a filter algorithm, and then determines whether the system power consumption is smaller than the second safe operating point.

5. The computer system according to claim 4, wherein the filter algorithm is an MAV algorithm or an ESF algorithm.

6. The computer system according to claim 1, wherein the first safe operating point is 95% of a rated power of the AC adapter.

7. The computer system according to claim 1, wherein the second safe operating point is 90% of a rated power of the AC adapter.

8. The computer system according to claim 1, wherein the embedded controller obtains a total power consumption and determines whether the total power consumption is greater than or equal to the system rated power; when the embedded controller enables the voltage turbo boost function and the total power consumption is greater than or equal to the system rated power, the battery and the AC adapter power the system load; the total power consumption is equal to the system power consumption and a power consumed by recharging the battery.

9. The computer system according to claim 8, wherein in the second frequency reduction mode and when the remaining battery percentage is smaller than the threshold, the embedded controller enables the frequency reduction function of the GPU.

10. The computer system according to claim 8, wherein in the third frequency reduction mode and when the remaining battery percentage is smaller than the threshold, the embedded controller enables the frequency reduction function of the CPU and the GPU.

11. The computer system according to claim 8, wherein the threshold is 30%.

12. A power management method for a computer system, the computer system comprising a system load, an AC adapter, a battery and a smart charger, the AC adapter being coupled to the system load and powering the system load, the system load comprising a CPU and a GPU; the power management method comprising:
obtaining a system power consumption;
determining whether the system power consumption is greater than a first safe operating point;
when the system power consumption is greater than the first safe operating point, controlling the CPU and the GPU to activate a frequency reduction mechanism according to a first adjustment sequence;
when the system power consumption is not greater than the first safe operating point, determining whether the system power consumption is smaller than a second safe operating point;
when the system power consumption is smaller than the second safe operating point, controlling the CPU and the GPU to deactivate the frequency reduction mechanism according to a second adjustment sequence;
obtaining a remaining power percentage of the battery;
determining whether the remaining power percentage is smaller than a threshold;
when the remaining power percentage is smaller than the threshold, disabling a voltage turbo boost function of the smart charger; and
when the remaining power percentage is not smaller than the threshold, enabling a voltage turbo boost function of the smart charger;
wherein, the second adjustment sequence is reverse to the first adjustment sequence; the first adjustment sequence is a first frequency reduction mode, a second frequency reduction mode and a third frequency reduction mode; the second adjustment sequence is the third frequency reduction mode, the second frequency reduction mode and the first frequency reduction mode; in the first frequency reduction mode, the embedded controller disables a frequency reduction function of the CPU and the GPU; in the second frequency reduction mode, the embedded controller disables the frequency reduction function of the CPU and enables the frequency reduction function of the GPU; and in the third frequency reduction mode, the embedded controller enables the frequency reduction function of the CPU and the GPU.

13. The power management method according to claim 12, wherein the step of determining whether the system power consumption is greater than the first safe operating point first filters out noises of the system power consumption according to a filter algorithm, and then determines whether the system power consumption is greater than the first safe operating point.

14. The power management method according to claim 13, wherein the filter algorithm is an MAV algorithm or an ESF algorithm.

15. The power management method according to claim 12, wherein the step of determining whether the system power consumption is smaller than the second safe operating point first filters out noises of the system power consumption according to a filter algorithm, and then determines whether the system power consumption is smaller than the second safe operating point.

16. The power management method according to claim 15, wherein the filter algorithm is an MAV algorithm or an ESF algorithm.

17. The power management method according to claim 12, wherein the first safe operating point is 95% of a rated power of the AC adapter.

18. The power management method according to claim 12, wherein the second safe operating point is 90% of a rated power of the AC adapter.

19. The power management method according to claim 12, further comprising:
obtaining a total power consumption, the total power consumption being equal to the system power consumption and a power consumed by recharging the battery;
determining whether the total power consumption is greater than or equal to the system rated power; and when the voltage turbo boost function is enabled and the total power consumption is greater than or equal to the system rated power, powering the system load by the battery and the AC adapter.

20. The power management method according to claim 12, wherein in the second frequency reduction mode and when the remaining battery percentage is smaller than the threshold, the frequency reduction function of the GPU is enabled.

21. The power management method according to claim 12, wherein in the third frequency reduction mode and when the remaining battery percentage is smaller than the threshold, the frequency reduction function of the CPU and the GPU is enabled.

22. The power management method according to claim 12, wherein the threshold is 30%.

* * * * *